(No Model.)
W. F. WUTERICH.
VELOCIPEDE.
No. 355,672. Patented Jan. 4, 1887.
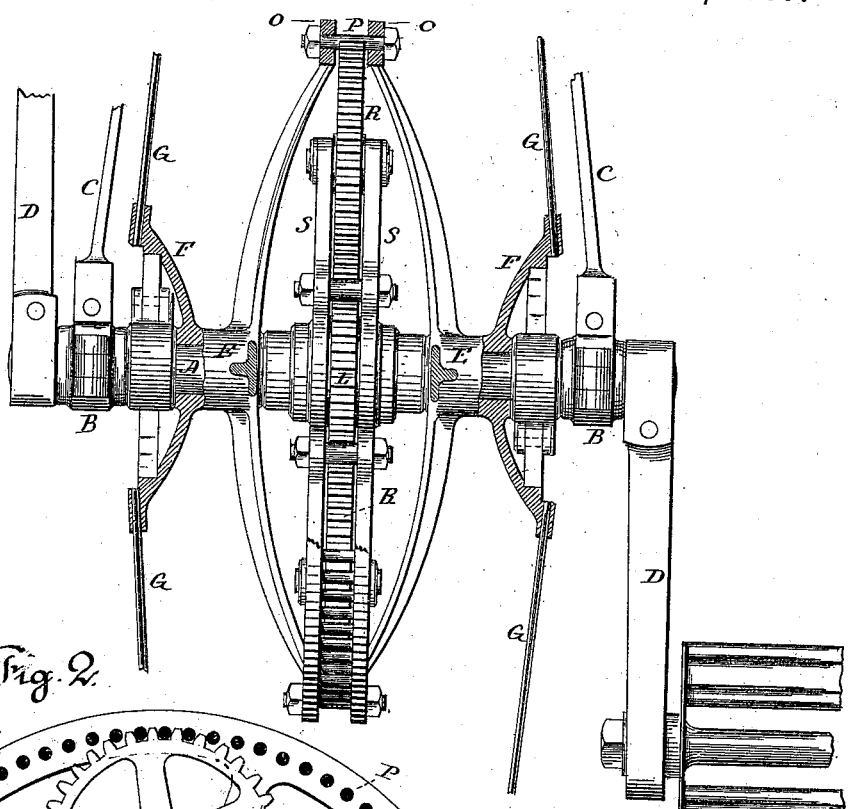
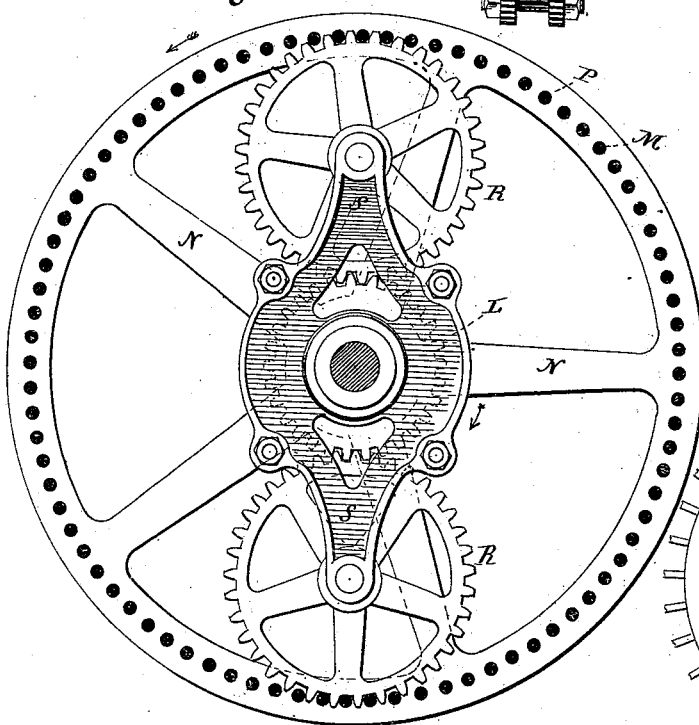
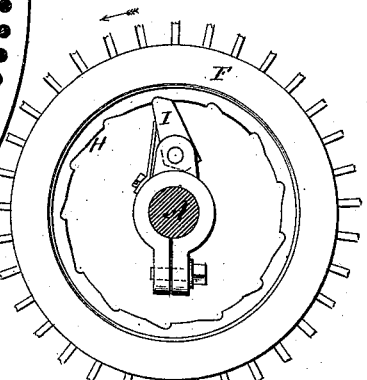

UNITED STATES PATENT OFFICE.

WILLIAM F. WUTERICH, OF MERIDEN, CONNECTICUT, ASSIGNOR OF ONE-HALF TO JOHN H. BARIO, OF SAME PLACE.

VELOCIPEDE.

SPECIFICATION forming part of Letters Patent No. 355,672, dated January 4, 1887.

Application filed July 20, 1885. Serial No. 172,084. (No model.)

*To all whom it may concern:*

Be it known that I, WILLIAM F. WUTERICH, of Meriden, in the county of New Haven and State of Connecticut, have invented a new Improvement in Velocipedes; and I do hereby declare the following, when taken in connection with accompanying drawings, and the letters of reference marked thereon, to be a full, clear, and exact description of the same, and which said drawings constitute part of this specification, and represent, in—

Figure 1, a front sectional view of the hub portion of the wheel and axles with their connections; Fig. 2, a transverse section through the internal gear in the wheel, showing side view of the intermediate gears and their connections with the axle; Fig. 3, an outside view of the hub, showing the pawl-and-ratchet connection between the axle and wheel.

This invention relates to an improvement in velocipedes, particularly adapted to that class of such machines commonly called "bicycles." A system of gearing similar to that which I illustrate in this application has been applied to the wheel and axle of a bicycle; but such gearing requires some sliding or shifting mechanism between the gearing, the axle, and the wheel independent of the pedals, to apply or remove the increased power of the pedals over the wheel, and this shifting or sliding is produced by the hand of the rider.

The object of my invention is a construction of gearing and its connections with the axle and pedals in which the rider has only to reverse the direction of his pedals—that is, the action of his feet—to apply the increased power, or to return to the direct action, as the case may be, and without any manipulation or shifting of the gearing or any of its parts.

In illustrating my invention I show only so much of the machine as is necessary to that end, the construction of the machine not being materially changed, except at the axle of the drive-wheel.

A represents the axle, which is supported in the usual bearings, B B, there being the usual extension, C, from the bearings up to the cross-head at the front. At each end of the axle oppositely-turned cranks D are applied, also in the usual manner.

E E represent the two parts of the hub of the wheel loose upon the axle. Each part is constructed of a disk-like shape, F, from which the spokes G run to the felly in the usual manner. These disks are each recessed, preferably, upon their outer face, to form an internally-toothed ratchet, H. (See Fig. 3.) On the axle a spring-pawl, I, is hung, as seen in Fig. 3, adapted to engage the ratchet with the axle, and so that turned in one direction— say forward—the axle will be so engaged with the wheel that the wheel and axle will revolve together, as in the usual arrangement of the wheel of bicycles; but if the shaft be turned in the opposite direction, then the pawl will escape the notches in the ratchet and the wheel be free from the action of the axle.

Centrally within the wheel a pinion, L, is fixed to the axle, and so as to turn with it. Concentric with this pinion is an internal gear, M, connected with the wheel, and this connection is best made by arms N, extending from the hub radially outward, carrying a ring, O, at their outer ends, the rings distant from each other the length of the tooth, and the teeth formed by introducing wire pins P through the two rings parallel with the axis, as seen in Figs. 1 and 2. Between the pinion L on the axle and the internal gear, M, on the wheel an intermediate gear or gears, R, are arranged in a frame or arms, S, extending outward from the axle, and so that the pinion on the axle, working into the intermediate gears, will communicate the rotation of the pinion to the gear M, if permitted so to do.

As before stated, if the cranks be turned in the direction to cause the pawl I to engage the tooth of the ratchet on the wheel, then the wheel will rotate with the axle, and the gears have no effect; but if the axle be turned in the reverse direction to free the pawl from its engagement with the wheel, then the pinion L is free to revolve independent of the gear on the wheel, and so revolving in the opposite direction, as indicated by the arrow in Fig. 2, will communicate its rotation to the driving-wheel, turning it in the same direction as before— that is, forward—as indicated by the arrow, but at a velocity reduced according to the difference between the gear M and the gear L.

The power, therefore, of the rider over the wheel is increased to the extent of this differential gearing, and so that while in ordinary riding the cranks will be driven forward with the wheel, in the usual manner, when an obstruction is to be encountered—as in climbing an ascent—the rider, by simply reversing his crank, increases his power over the wheel in proportion to the difference in the gearing; or at any point where the rider desires to increase his power over his machine he can do so by reversing the direction of his cranks; or, if running with the greatest power applied, when he desires to increase his speed, then turn the cranks in that direction.

I have illustrated two intermediate gears between the pinion and the internal gear on the wheel; but one only is necessary, or more may be applied.

The change of the cranks from one direction to the other is instantly applied to the machine without care or attention or any other act of the rider than simply reversing the direction of his pedals, and this is instantly applied, because there is no connection or disconnection to be mechanically made, as in previous gears of this character.

I have described the invention as applied to the driving-wheel of a bicycle; but it will be understood that it may be applied to tricycles or similar machines driven by cranks upon an axle.

From the foregoing it will be understood that I do not claim, broadly, an internal gear concentric with the axis fixed to the drive-wheel, with a concentric pinion with its gear driven in the opposite direction and so as to communicate power to the internal gear and thence to the drive-wheel, such power increased or decreased according to the direction in which the pinion revolves; but What I do claim, and desire to secure by Letters Patent, is—

In a velocipede, the combination of an axle, a crank adapted to turn said axle in either direction, a drive-wheel loose upon said axle, a concentric shoulder or surface in connection with said wheel, a pawl hung upon the axle and so as to revolve with it, the said pawl adapted to engage said concentric surface in one direction and escape therefrom in the opposite direction, a concentric internal gear fixed to said drive-wheel, a concentric pinion fixed to the said axle, a frame loose upon the axle, and one or more gears in said frame between said pinion and said internal gear, substantially as and for the purpose described.

WILLIAM F. WUTERICH.

Witnesses:
   CHARLES H. SAWYER,
   GEORGE SIERING.